United States Patent
Mahalingaiah

(10) Patent No.: US 6,253,309 B1
(45) Date of Patent: *Jun. 26, 2001

(54) FORCING REGULARITY INTO A CISC INSTRUCTION SET BY PADDING INSTRUCTIONS

(75) Inventor: Rupaka Mahalingaiah, Austin, TX (US)

(73) Assignee: Advanced Micro Devices, Inc., Sunnyvale, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/157,719

(22) Filed: Sep. 21, 1998

(51) Int. Cl.$^7$ .................................................. G06F 15/00
(52) U.S. Cl. ........................ 712/213; 712/210; 712/23; 717/9
(58) Field of Search .................... 712/23, 209, 210, 712/213; 717/5, 6, 9, 8

(56) References Cited

U.S. PATENT DOCUMENTS

| | | | |
|---|---|---|---|
| 5,057,837 | * 10/1991 | Colwell et al. | 341/35 |
| 5,586,277 | 12/1996 | Brown et al. | 712/210 |
| 5,758,114 | 5/1998 | Johnson et al. | 712/204 |
| 5,774,710 | 6/1998 | Chung | 712/238 |
| 5,809,273 | 9/1998 | Favor et al. | 712/210 |
| 5,822,778 | 10/1998 | Dutton et al. | 711/208 |
| 5,832,299 | 11/1998 | Wooten | 710/9 |
| 5,896,519 | 4/1999 | Worrell | 712/238 |
| 5,905,893 | * 5/1999 | Worrell | 395/705 |
| 5,925,124 | 7/1999 | Hilgendorf et al. | 712/227 |
| 5,933,642 | 8/1999 | Greenbaum et al. | 717/9 |
| 5,948,100 | 9/1999 | Hsu et al. | 712/238 |
| 5,951,671 | 9/1999 | Green | 712/23 |
| 5,958,046 | 11/1999 | Bondi et al. | 712/230 |
| 5,978,906 | 11/1999 | Tran | 712/23 |
| 5,983,334 | 11/1999 | Coon et al. | |
| 5,991,869 | 11/1999 | Tran | 711/125 |
| 6,012,125 | 1/2000 | Tran | 711/125 |
| 6,014,735 | 1/2000 | Chennupaty et al. | 712/210 |
| 6,016,545 | 1/2000 | Mahalingaiah et al. | 712/238 |
| 6,023,756 | 2/2000 | Okamura | 712/208 |
| 6,035,387 | 3/2000 | Hsu et al. | 712/210 |
| 6,038,645 | 3/2000 | Nanda et al. | 711/141 |
| 6,049,863 | 4/2000 | Tran et al. | 712/213 |
| 6,061,786 | 5/2000 | Witt | 712/237 |

* cited by examiner

Primary Examiner—Larry D. Donaghue
(74) Attorney, Agent, or Firm—Conley, Rose & Tayon, P.C.; Dan R. Christen

(57) ABSTRACT

A microprocessor configured to rapidly decode variable-length instructions is disclosed. The microprocessor is configured with a predecoder and an instruction cache. The predecoder is configured to expand variable-length instructions to create fixed-length instructions by padding instruction fields within each variable-length instruction with constants until each field reaches a predetermined maximum width. The fixed-width instructions are then stored within the instruction cache and output for execution when a corresponding requested address is received. The instruction cache may store both variable- and fixed-width instructions, or just fixed-width instructions. An array of pointers may be used to access particular fixed-length instructions. The fixed-length instructions may be configured to all have the same fields and the same lengths, or they may be divided into groups, wherein instructions within each group have the same fields and the same lengths. A software program configured to generate fixed-length instructions from variable-length instructions is also disclosed. A method for predecoding variable-length instructions is also disclosed.

20 Claims, 11 Drawing Sheets

```
8BD8            MOV     BX,AX
B80044          MOV     AX,4400
F6C280          TEST    DL,80
7433            JZ      014C
0A061499        OR      AL,[9914]
3402            XOR     AL,02
CD21            INT     21
F3              REPZ
88C4            MOV     AH,AL
C606119601      MOV     BYTE PTR [9611],01
```

| PREFIX BYTES | OPCODE | MOD R/M | S-I-B | DISPLACEMENT | DATA |
|---|---|---|---|---|---|
| 00 00 00 00 00 | 8B 00 | D8 | | | |
| 00 00 00 00 00 | B8 00 | 00 | 00 | 00 00 00 00 | 00 00 00 00 |
| 00 00 00 00 00 | F6 00 | C2 | 00 | 00 00 00 00 | 00 44 00 00 |
| 00 00 00 00 00 | 74 00 | 00 | 00 | 00 00 00 00 | 80 00 00 00 |
| 00 00 00 00 00 | 0A 00 | 06 | 00 | 00 00 00 00 | 33 00 00 00 |
| 00 00 00 00 00 | 34 00 | 00 | 00 | 00 00 00 00 | 14 99 00 00 |
| 00 00 00 00 00 | CD 00 | 00 | 00 | 00 00 00 00 | 02 00 00 00 |
| 00 F3 00 00 00 | 88 00 | C4 | 00 | 00 00 00 00 | 21 00 00 00 |
| 00 00 00 00 00 | C6 00 | 06 | 00 | 11 96 00 00 | 00 00 00 00 |
| | | | | | 01 00 00 00 |

Fig. 4

```
8BD8            MOV     BX,AX
B80044          MOV     AX,4400
F6C280          TEST    DL,80
7433            JZ      014C
0A061499        OR      AL,[9914]
3402            XOR     AL,02
CD21            INT     21
F3              REPZ
88C4            MOV     AH,AL
C606119601      MOV     BYTE PTR[9611],01
```

| PREFIX BYTE | OPCODE | MOD R/M | S-I-B | DISPLACEMENT | DATA |
|---|---|---|---|---|---|
| 00 | 8B 00 | D8 | 00 | 00 00 00 00 | 00 00 00 00 |
| 00 | B8 00 | 00 | 00 | 00 00 00 00 | 00 44 00 00 |
| 00 | F6 00 | C2 | 00 | 00 00 00 00 | 80 00 00 00 |
| 00 | 74 00 | 00 | 00 | 00 00 00 00 | 33 00 00 00 |
| 00 | 0A 00 | 06 | 00 | 00 00 00 00 | 14 99 00 00 |
| 00 | 34 00 | 00 | 00 | 00 00 00 00 | 02 00 00 00 |
| 00 | CD 00 | 00 | 00 | 00 00 00 00 | 21 00 00 00 |
| 10 | 88 00 | C4 | 00 | 00 00 00 00 | 00 00 00 00 |
| 00 | C6 | 06 | 00 | 11 96 00 00 | 01 00 00 00 |

Fig. 5

FORCING REGULARITY INTO A CISC INSTRUCTION SET BY PADDING INSTRUCTIONS

BACKGROUND OF THE INVENTION

1. Field of the Invention

This invention relates to microprocessors and, more particularly, to decoding variable length instructions within a microprocessor.

2. Description of the Relevant Art

The number of software applications written for the x86 instruction set is quite large. As a result, despite the introduction of newer and more advanced instruction sets, microprocessor designers have continued to design microprocessors capable of executing the x86 instruction set.

The x86 instruction set is relatively complex and is characterized by a plurality of variable-length instructions. A generic format illustrative of the x86 instruction set is shown in FIG. 1. As illustrated in the figure, an x86 instruction consists of from one to five optional prefix bytes 102, followed by an operation code (opcode) field 104, an optional addressing mode (Mod R/M) byte 106, an optional scale-index-base (SIB) byte 108, an optional displacement field 110, and an optional immediate data field 112.

The opcode field 104 defines the basic operation for a particular instruction. The default operation of a particular opcode may be modified by one or more prefix bytes 102. For example, one of prefix bytes 102 may be used to change the address or operand size for an instruction, to override the default segment used in memory addressing, or to instruct the processor to repeat a string operation a number of times. The opcode field 104 follows prefix bytes 102, if present, and may be one or two bytes in length. The addressing mode (Mod R/M) byte 106 specifies the registers used as well as memory addressing modes. The scale-index-base (SIB) byte 108 is used only in 32-bit base-relative addressing using scale and index factors. A base field within SIB byte 108 specifies which register contains the base value for the address calculation, and an index field within SIB byte 108 specifies which register contains the index value. A scale field within SIB byte 108 specifies the power of two by which the index value will be multiplied before being added, along with any displacement, to the base value. The next instruction field is a displacement field 110, which is optional and may be from one to four bytes in length. Displacement field 110 contains a constant used in address calculations. The optional immediate field 112, which may also be from one to four bytes in length, contains a constant used as an instruction operand. The shortest x86 instructions are only one byte long, and comprise a single opcode byte. The 80286 sets a maximum length for an instruction at 10 bytes, while the 80386 and 80486 both allow instruction lengths of up to 15 bytes.

The complexity of the x86 instruction set poses many difficulties in implementing high performance x86-compatible microprocessors. In particular, the variable length of x86 instructions makes decoding instructions difficult. Decoding instructions typically involves determining the boundaries of an instruction and then identifying each field within the instruction, e.g., the opcode and operand fields. Decoding typically takes place once the instruction is fetched from the instruction cache before execution.

One method for determining the boundaries of instructions involves generating a number of predecode bits for each instruction byte read from main memory. The predecode bits provide information about the instruction byte they are associated with. For example, an asserted predecode start bit indicates that the associated instruction byte is the first byte of an instruction. Similarly, an asserted predecode end bit indicates that the associated instruction byte is the last byte of an instruction. Once the predecode bits for a particular instruction byte are calculated, they are stored together with the instruction byte in an instruction cache. When a "fetch" is performed, i.e., a number of instruction bytes are read from the instruction cache, the associated start and end bits are also read. The start and end bits may then be used to generate valid masks for the individual instructions with the fetch. A valid mask is a series of bits in which each bit corresponds to a particular instruction byte. Valid mask bits associated with the first byte of an instruction, the last byte of the instruction, and all bytes in between the first and last bytes of the instruction are asserted. All other valid mask bits are not asserted. Turning now to FIG. 2, an exemplary valid mask is shown. The figure illustrates a portion of a fetch 120 and its associated start and end bits 122 and 124. Assuming a valid mask 126 for instruction B 128 is to be generated, start and end bits 122 and 124 would be used to generate the mask. Valid mask 126 could then be used to mask off all bytes within fetch 120 that are not part of instruction B 128.

Once the boundaries of an instruction have been determined, the fields within the instruction, e.g., the opcode and operand fields, may be identified. Once again, the variable length of x86 instructions complicates the identification process. In addition, the optional prefix bytes within an x86 instruction create further complications. For example, in some instructions the opcode will begin with the first byte of the instruction, while others may begin with the second, third, or fourth byte.

To perform the difficult task of decoding x86 instructions, a number of cascaded levels of logic are typically used. Thus, decoding may require a number of clock cycles and may create a significant delay before any instructions are available to the functional stages of the microprocessor's pipeline. As microprocessors increase the number of instructions they are able to execute per clock cycle, instruction decoding may become a performance limiting factor. Therefore, a mechanism for simplifying the complexity and time required for instruction decoding is needed.

SUMMARY

The problems outlined above are in large part solved by a microprocessor capable of predecoding variable-length instructions into fixed-length instructions. In one embodiment, the microprocessor comprises a predecoder and an instruction cache. The predecoder is configured to receive variable-length instructions and predecode them into fixed-length instructions. The variable-length instructions are predecoded by padding constants into different instruction fields within the variable-length instruction. Constants may be inserted in each instruction field that does not have a predetermined maximum number of bytes. The instruction cache is coupled to receive the fixed-length instructions from the predecoder and store them. When the instruction cache receives a requested address the cache is configured to output a corresponding fixed-length instruction. By predecoding variable-length instructions to fixed lengths, decode time may advantageously be reduced.

In another embodiment, the instruction cache may further comprise a pointer array configured to store a plurality of pointers. Each stored pointer may be configured to point to one particular fixed-length instruction stored within the instruction cache. These pointer may advantageously allow particular fixed-length instructions to be accessed even though the instructions' location within the instruction cache may not correspond to particular requested addresses (i.e., because of the offset created by padding).

A software program embodied on computer-readable media is also contemplated. In one embodiment the program comprises a first section of code configured to decode variable-length instructions into a plurality of fields. A second section of code may be configured to generate fixed-length instructions from the variable length instructions by expanding the fields to a predetermined maximum length. The fields may be expanded by inserting constants that act as place holders into the fields. The software program may be part of a high-level language compiler or the program may be a separate routine for optimizing existing object code.

In another embodiment the software program may comprise pluralities of instructions. The first plurality may be configured to determine the length of variable-length instructions, and the second plurality may be configured to append constants to the end of the variable length instruction until the variable-length instruction has reached a predetermined length. The constant may be added to any variable-length instruction that does not have a length that is evenly divisible by a second constant.

A method for predecoding variable-length instructions is also contemplated. In one embodiment, the method comprises receiving a variable-length instruction and determining which fields are present within the instruction. Of the fields that are present, each is examined to determine which have space to store additional bytes. Next fixed-length instructions are formed by filling each field with constants until all fields are full. Finally, the resulting fixed-length instruction is output.

BRIEF DESCRIPTION OF THE DRAWINGS

Other objects and advantages of the invention will become apparent upon reading the following detailed description and upon reference to the accompanying drawings in which:

FIG. 4 is table illustrating one embodiment of a method for decoding variable-length instructions into fixed-length instructions.

FIG. 5 is a table illustrating another embodiment of a method for decoding variable-length instructions into fixed-length instructions.

Figure 1:
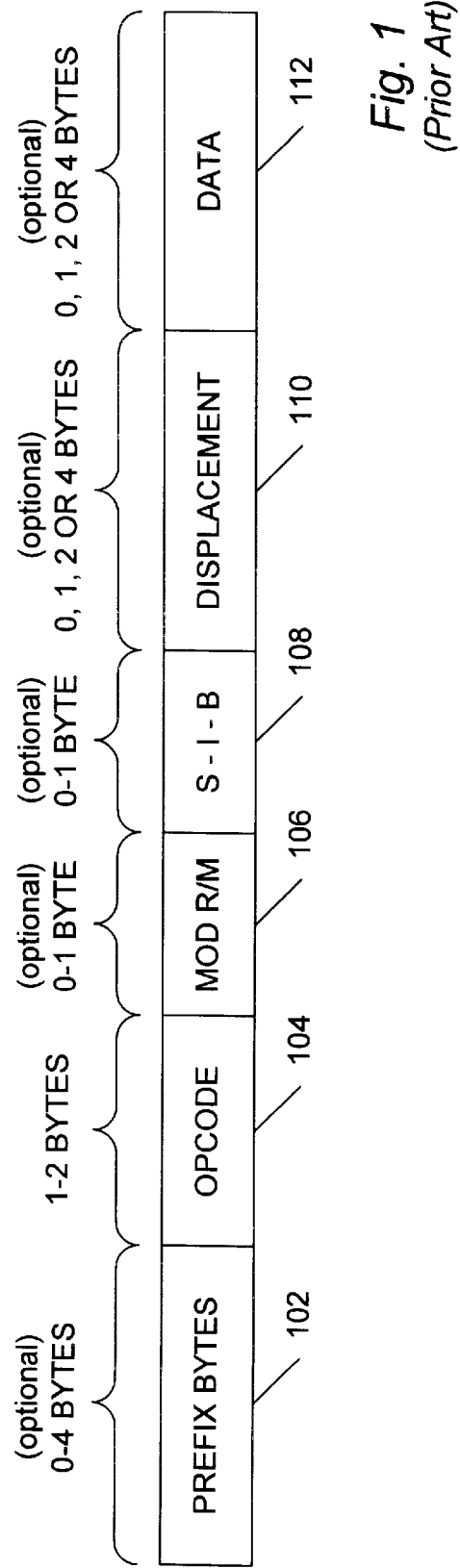
FIG. 1 is a block diagram of a generic x86 instruction format.
Figure 2:
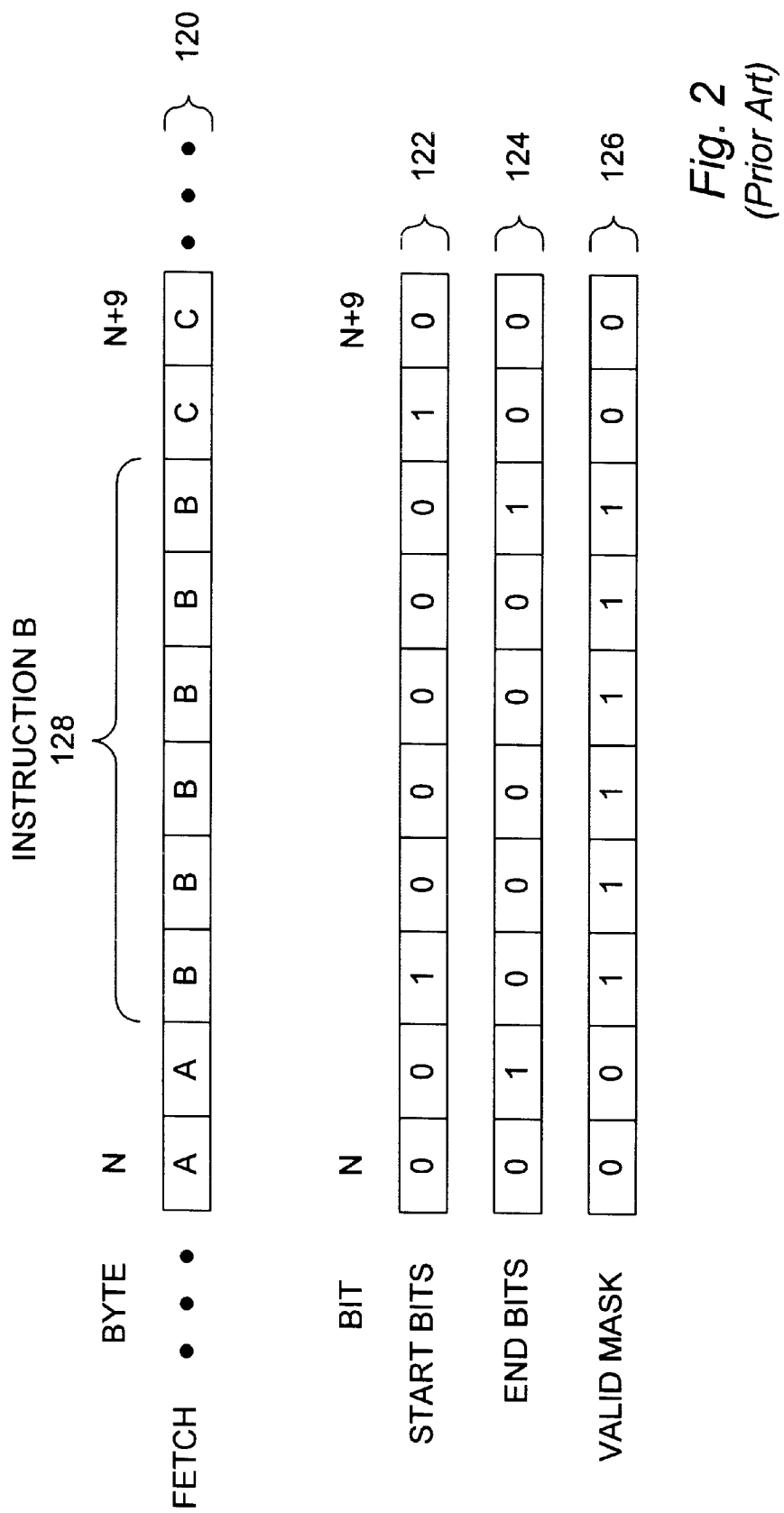
FIG. 2 is a block diagram illustrating one embodiment of a valid mask.

While the invention is susceptible to various modifications and alternative forms, specific embodiments thereof are shown by way of example in the drawings and will be described in detail herein. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF AN EMBODIMENT

Figure 3:
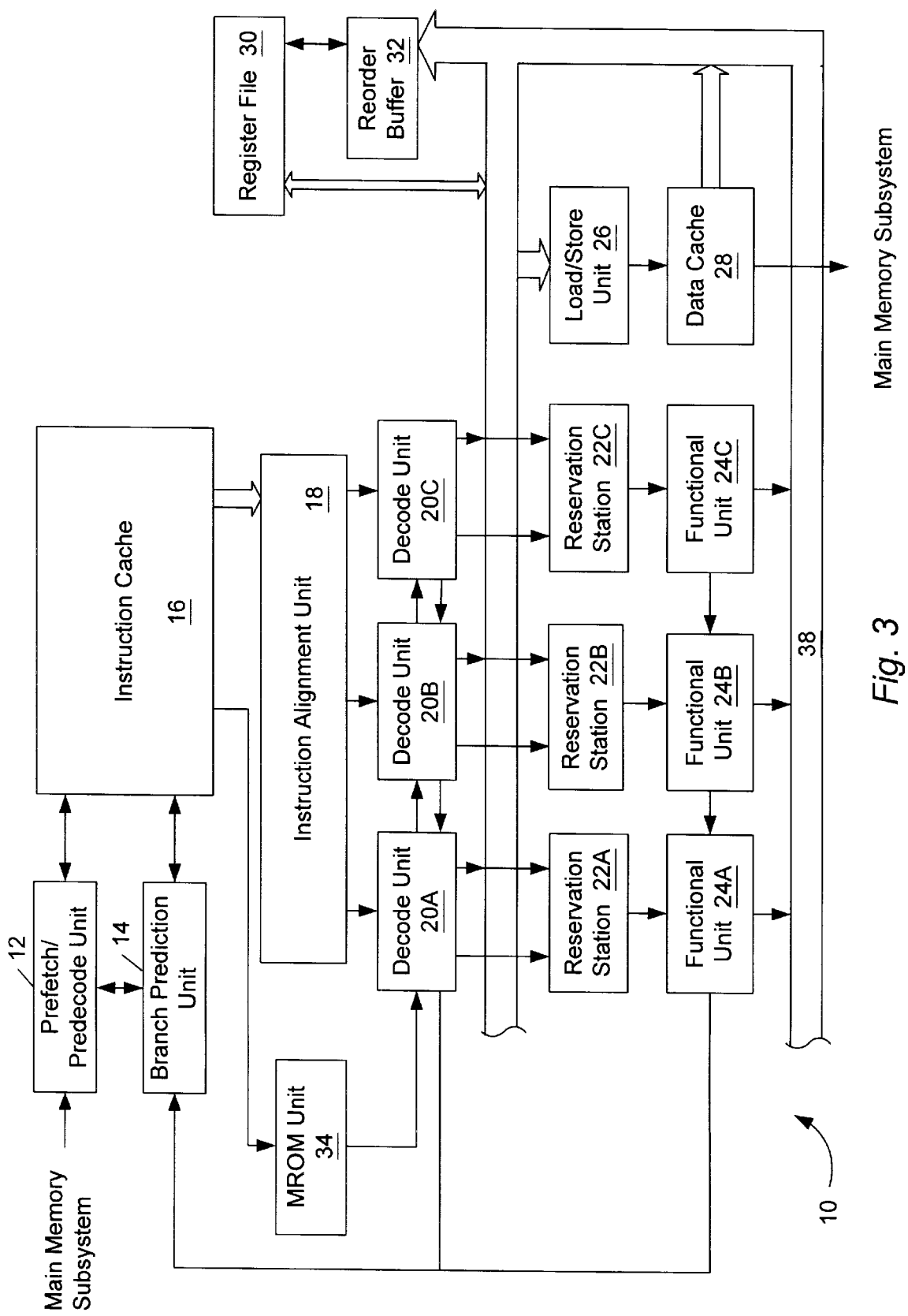
FIG. 3 is a block diagram of one embodiment of a microprocessor.

Turning now to FIG. 3, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and MROM unit 34. Elements referred to herein with a particular reference number followed by a letter may be collectively referred to by the reference number alone. For example, reservation stations 22A–22C may be collectively referred to as reservation stations 22.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to instruction alignment unit 18 and functional units 24. Instruction cache 16 is further coupled to MROM unit 34 and instruction alignment unit 18. Instruction alignment unit 18 is in turn coupled to load/store unit 26 and to respective decode units 20A–20C. Respective decode units 20A–20C are coupled to reservation stations 22A–22C, which are further coupled to respective functional units 24A–24C. Additionally, instruction alignment unit 18 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to instruction alignment unit 18.

Instructions are prefetched from main memory by prefetch/predecode unit 12. Prefetch/predecode unit 12 predecodes the variable-length instructions to fixed length instructions which are then stored in instruction cache 16. Instructions may be prefetched and predecoded before they are actually requested by using a prefetch scheme. A variety of prefetch schemes may be employed by prefetch/predecode unit 12. Before proceeding with a more detailed description of predecode unit 12, general aspects regarding the embodiment of exemplary microprocessor 10 shown in the figure will be described.

Microprocessor 10 may employ branch prediction in order to speculatively fetch instructions subsequent to conditional branch instructions. Branch prediction unit 14 is included to perform branch prediction operations. In one embodiment, up to two branch target addresses are stored for each 16-byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched to branch prediction unit 14. This allows branch prediction unit 14 to determine which branch target addresses to select when forming a branch prediction. Instruction alignment unit 18 and functional units 24 provide update information to branch prediction unit 14. Because branch prediction unit 14 stores two targets per 16-byte portion of the cache line, predictions for some branch instructions within the line may not be stored in branch prediction unit 14. Instruction alignment unit 18 may be configured to detect branch instructions which were not predicted by branch prediction unit 14. Functional units 24 execute the branch instructions and determine if the predicted branch direction was mispredicted. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instruction cache 16 is a high speed cache memory provided to store instructions received from prefetch/predecode unit 12. Stored instructions are then fetched from instruction cache 16 and forwarded to instruction alignment unit 18. In one embodiment, instruction cache 16 may be configured as a set-associative structure. Instruction cache 16 may additionally employ a way prediction scheme in order to speed access times. For example, instead of accessing tags identifying each line of instructions and comparing the tags to the fetch address to select a way, instruction cache 16 may predict the way that is accessed. In this manner, the way is speculatively selected prior to accessing the array. Using way prediction, the access time of instruction cache 16 may be similar to a direct-mapped cache. After the instruction bytes have been read, a tag comparison is performed for verification. If the way prediction is incorrect, the correct instruction bytes are fetched and the incorrect instruction bytes (which are further down the processing pipeline) are discarded. It is noted that instruction cache 16 may be implemented in fully associative, set associative, or direct mapped configurations.

MROM unit 34 is a read-only memory that is configured to store sequences of "fast-path instructions." Fast path instructions are instructions that may be decoded and executed by decoders 20A–C and functional units 24A–C. In contrast, "MROM instructions" are instructions which are too complex for direct decoding or execution by decoders 20A–C and functional units 24A–C. When instruction cache 16 outputs an MROM instruction, MROM unit 34 responds by outputting a sequence of fast path instructions. More specifically, MROM unit 34 parses and translates the MROM instruction into a subset of defined fast path instructions to effectuate the desired operation. MROM unit 34 dispatches the subset of fast path instructions to decode units 20A–C.

Once instruction bytes are fetched from instruction cache 16, they are conveyed to instruction alignment unit 18. Instruction alignment unit 18 routes the instructions to one of decode unit 20A–C. Register operand information is also detected and routed to register file 30 and reorder buffer 32. Additionally, if the instructions require one or more memory operations to be performed, instruction alignment unit 18 dispatches the memory operations to load/store unit 26. Each decoded instruction is dispatched to reservation stations 22 along with operand address information and displacement or immediate data which may be included with the instruction.

Microprocessor 10 supports out-of-order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register. The temporary storage location stores the speculative register state that results from the speculative execution of an instruction. If a branch prediction is incorrect, the results from the speculatively-executed instructions along the mispredicted path can be invalidated in the reorder buffer 32 before they are written to register file 30. Similarly, if a particular instruction causes an exception, instructions subsequent to the exception-causing instruction may be discarded. In this manner, exceptions are "precise" (i.e., instructions subsequent to the exception-causing instruction are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The decoded instructions and immediate or displacement data provided at the outputs of instruction alignment unit 18 are routed directly to respective reservation stations 22. In one embodiment, each reservation station 22 is capable of holding instruction information (i.e., decoded instructions as well as operand values, operand tags and/or immediate data) for up to three pending instructions awaiting issue to the corresponding functional unit. It is noted that for the embodiment shown in the figure, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32-bit real registers (i.e., typically referred to as EAX, EBX, ECX EDX, EBP, ESI, EDI and ESP). In embodiments of microprocessor 10 which employ the x86 microprocessor architecture, register file 30 comprises storage locations for each of the 32-bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register.

If following decode of a given instruction it is determined that reorder buffer 32 has a previous location or locations assigned to a register used as an operand in the given instruction, reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions whenever one or more instructions are dispatched by instruction alignment unit 18. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each functional units 24A–C is configured to perform integer arithmetic operations of addition and subtraction, as well as shifts, rotates, logical operations, and branch operations. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes a fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. When the buffer is full, instruction alignment unit 18 waits until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations may be performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight-way set-associative structure. Similar to instruction cache 16, data cache 28 may employ a way prediction mechanism. It is understood that data cache 28 may be implemented in a variety of specific memory configurations, including set-associative and direct-mapped configurations.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Prefetch/Predecode Unit and Instruction Cache Configuration

Turning now to FIG. 4, one method for predecoding variable-length instructions into fixed length instructions is shown. Sample code 60 represents a plurality of variable-length instructions, in this case x86 instructions. While this method may be used with a number of different types of variable-length instructions (e.g., 68000 instructions), x86 instructions are chosen for illustration purposes. In this embodiment, predecode unit 12 is configured to receive each variable-length instruction and then pad each field within the variable-length instruction to a predetermined maximum field width. While any predetermined constant may be used, e.g., $90_{16}$, the examples herein use $00_{16}$ as the padding constant.

The prefix bytes are expanded to five bytes. The first byte may be reserved for segment override information and may comprise one of the following: $00_{16}$ representing no segment override, $26_{16}$ representing the ES segment, $2E_{16}$ representing the CS segment, $36_{16}$ representing the SS segment, $3E_{16}$ representing the DS segment, $64_{16}$ representing the FS segment, or $65_{16}$ representing the GS segment. The second byte may be reserved for repeat information and may comprise one of the following: $00_{16}$ representing no repeat information, $F2_{16}$ representing the REPNE/REPNZ operation, or F3 $_6$ representing the REP/REPE/REPZ operation. The third byte may be reserved for hardware lock information for memory operations in multiprocessor environments and may comprise one of the following: $00_{16}$ representing no lock information, or $F0_{16}$ representing an asserted hardware lock. The fourth byte may be reserved for operand size information and may comprise one of the following: $00_{16}$ representing no change in operand size, or $66_{16}$ for toggling the word size. Similarly, the fifth byte may be reserved for address size information and may comprise one of the following: $00_{16}$ representing no change in address size, or $67_{16}$ for toggling between 16 and 32-bit addressing. Note the above nomenclature matches the existing x86 nomenclature, but other constants for each function may be selected in other embodiments.

As previously noted, one major difficulty in decoding variable-length instructions is determining where each instruction begins and ends. By predecoding instructions to a fixed-length, each instruction is automatically aligned when it is read from instruction cache 16. Advantageously, instruction alignment unit 18 and decoders 20A–C may be simplified. In some embodiments, one or more decode units 20A–20C may be optimized to receive fixed-length instructions, thereby further improving decode speed. In other embodiments, one or more decoder units 20A–20C may be bypassed completely for fixed-length instructions.

A second difficulty in decoding variable-length instructions is determining which instruction and operand fields are present and where those instruction fields begin and end. By predecoding instructions to the format illustrated, determining which fields are present in each instruction and which, if any, operands are required, may be simplified.

Turning now to FIG. 5, another embodiment of this method is illustrated. In this embodiment, the five prefix bytes 102 from the previous embodiment's fixed-length instruction format 60 are compressed into a single prefix byte 130. This results in a fixed length of thirteen bytes for each fixed-length instruction. Advantageously, using this format the benefits of a fixed-length format may be preserved while reducing the amount of storage required for each fixed-length instruction.

Figure 6:
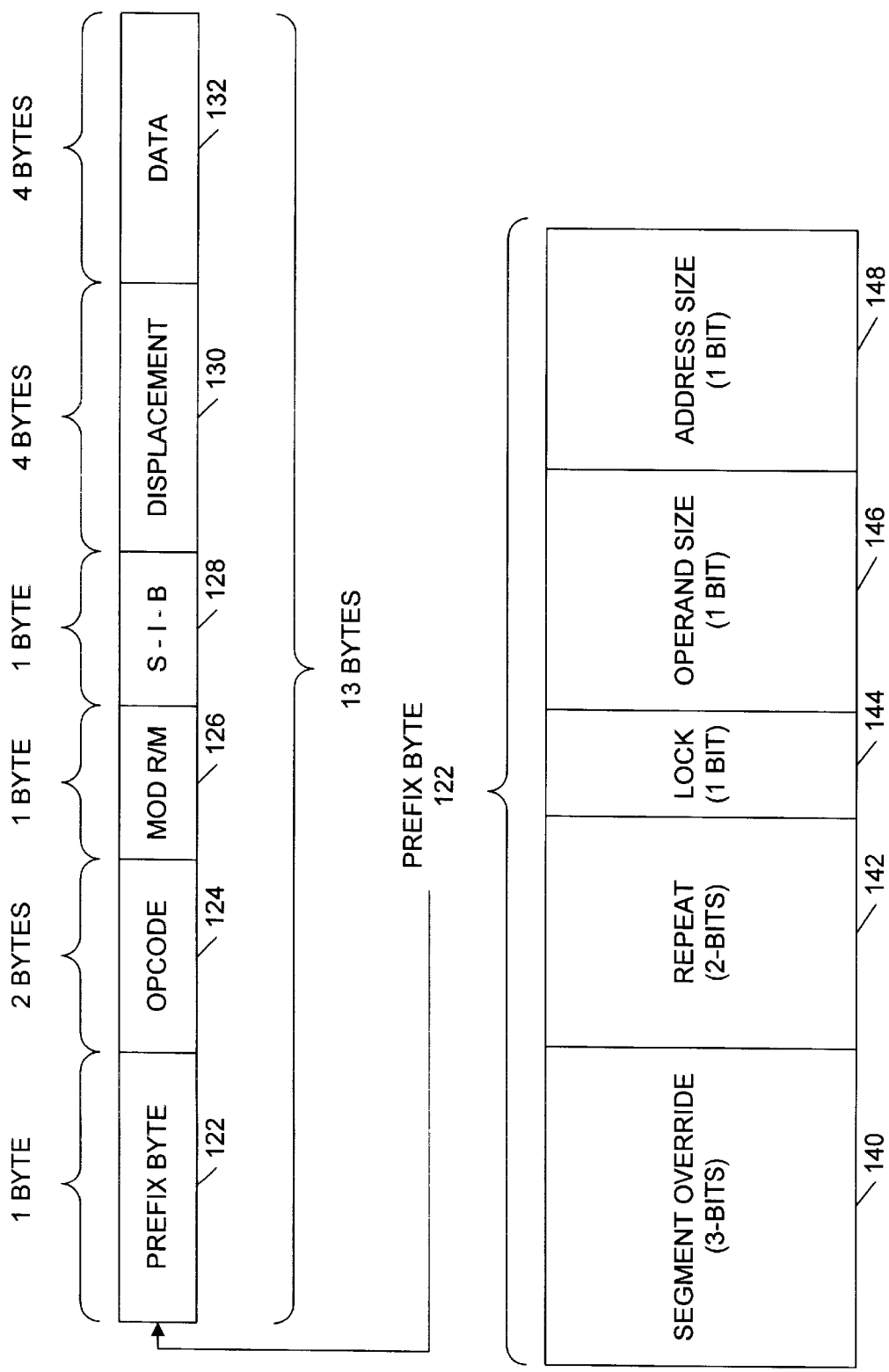
FIG. 6 is a diagram illustrating details of the method illustrated in FIG. 5.

Turning now to FIG. 6, details of one embodiment of prefix compression are shown. In this embodiment, prefix byte 122 comprises a 3-bit segment override field 140, a 2-bit repeat field 142, a single lock bit 144, a single operand size bit 146, and a single address size bit 148. Segment override information may be encoded into three bits of prefix byte 122 as follows. A prefix byte of $26_{16}$, which indicates that the contents of the ES register are to be used to define the segment, may be replaced by the bit sequence $001_2$. Similarly, a prefix byte of $2E_{16}$ (ES register) may be replaced by the bit sequence $010_2$. A prefix byte of $36_{16}$ (ES register) may be replaced by $011_2$. A prefix byte of $3E_{16}$ (DS register) may be replaced by $100_2$. A prefix byte of $64_{16}$ (FS register) may be replaced by $101_2$. A prefix byte of $65_{16}$ (GS register) may be replaced by $110_2$. If there is no segment override, $000_2$ may be used in segment override field 140.

The prefix repeat information may be encoded into a 2-bit repeat field 142 of prefix byte 122 as follows. A prefix byte of F2 (REPNE/REPNZ) may be replaced with the bit sequence $01_2$. Similarly, a prefix byte of F3 (REP/REPE/REPZ) may be replaced by the bit sequence $10_2$. If there is no repeat information, $00_2$ may be used in repeat field 142. If a lock instruction $F0_{16}$ is present, this information may be encoded into a single lock bit 144. Similarly, if a toggle operand size byte $66_{16}$ is present, this information may be encoded into a single bit 146. The presence of a toggle address size byte $67_{16}$ may be encoded into bit 148. Thus, all five bytes of prefix information may be compressed into a single prefix byte 122. Advantageously, using this method saves space within instruction cache 16 while still providing clearly defined fields that do not vary from one instruction to the next.

Figure 7:
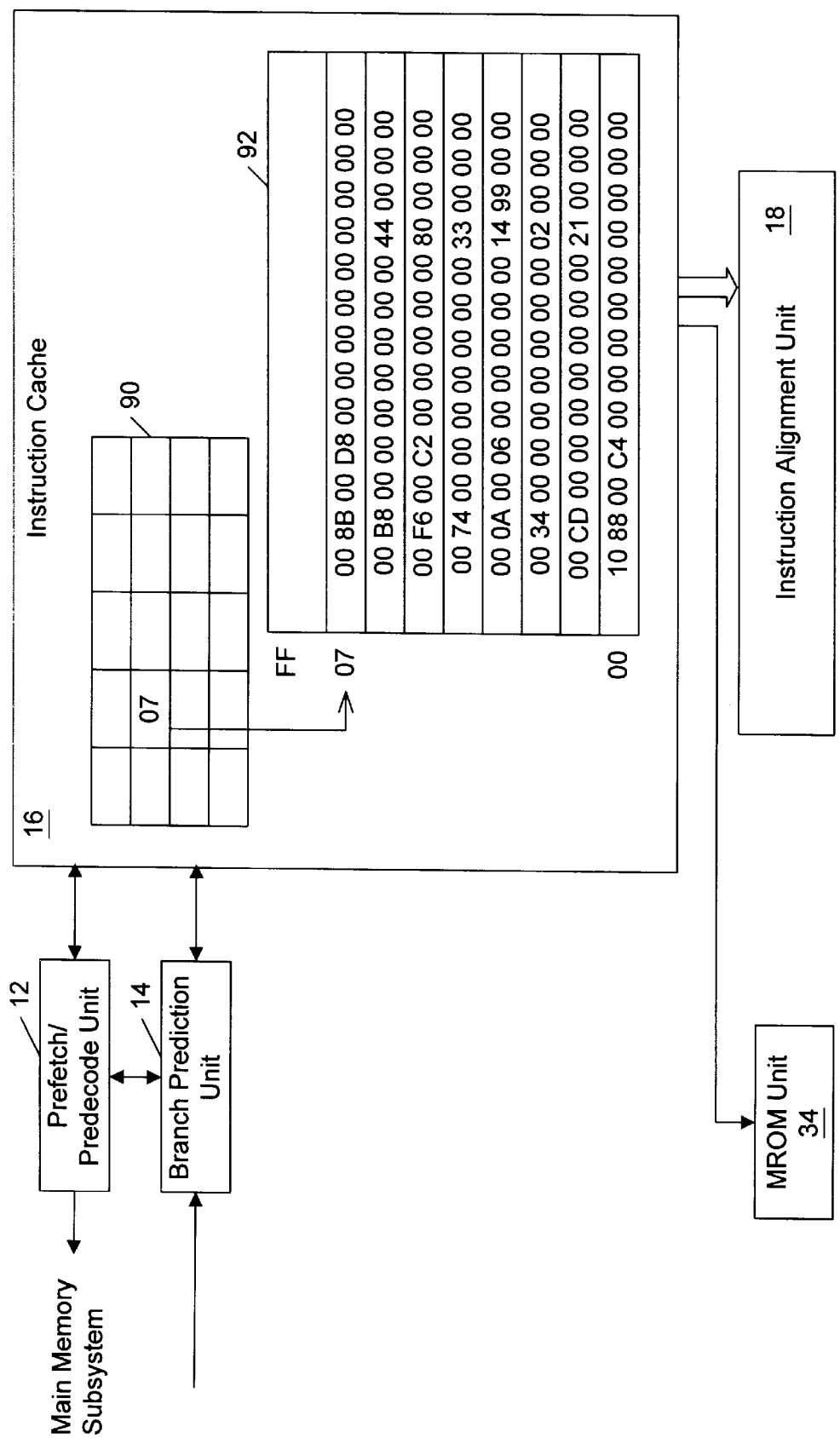
FIG. 7 is a diagram illustrating one possible embodiment of the instruction cache from FIG. 3.

Turning now to FIG. 7, details of one embodiment of instruction cache 16 are shown. In this embodiment, instruction cache 16 comprises a lookup table 90 and an instruction storage array 92. Lookup table 90 comprises a plurality of storage locations configured to store pointers to storage locations within instruction storage array 92. Instruction storage array 92 comprises a plurality of instruction storage locations each configured to store a fixed-length instruction received from prefetch/predecode unit 12.

Upon receiving a predecoded fixed-length instruction for predecode unit 12, instruction cache 16 stores the instruction in a particular storage location within instruction storage array 92. Instruction cache 16 stores a pointer to that particular storage location in pointer array 90. Pointer array 90 may be configured similarly to standard instruction caches, except smaller. For example, pointer array 90 may be configured as a set-associative cache with way prediction as previously disclosed. Instruction storage array 92 may be configured as direct mapped, or may also be configured in a set-associative structure.

An example of the operation of this embodiment of instruction cache 16 is now illustrated. When an instruction is received from predecode unit 12 (e.g., 00 8B 00 D8 00 00 00 00 00 00 00 00 00), instruction cache 16 is configured to store this instruction into the next available storage location within instruction storage array 92. Using the example configured from the figure, the instruction is stored into an instruction storage location having an index $07_{16}$. Thus, instruction cache 16 stores the index value $07_{16}$ into pointer array 90. The particular storage location within pointer array 90 is selected just as a cache line storage location would be selected in a standard instruction cache. For example, assuming the first byte of instruction 8BD8 was located at logical address 0A8D:0100, the pointer $07_{16}$ may be stored in the location within pointer array 90 that corresponds to logical address 0A8D:0100. As previously noted, in other embodiments pointer array 90 may be linearly addressed.

Upon receiving a request for the instruction residing as logical address 0A8D:0100, instruction cache 16 may access pointer array 90 and read the pointer that corresponds to the requested address, i.e., $07_{16}$. This pointer is then used access a storage location within instruction storage array 92. The instruction stored therein (i.e., 00 8B 00 D8 00 00 00 00 00 00 00 00) is then read and output to instruction alignment unit 18.

Figure 8:
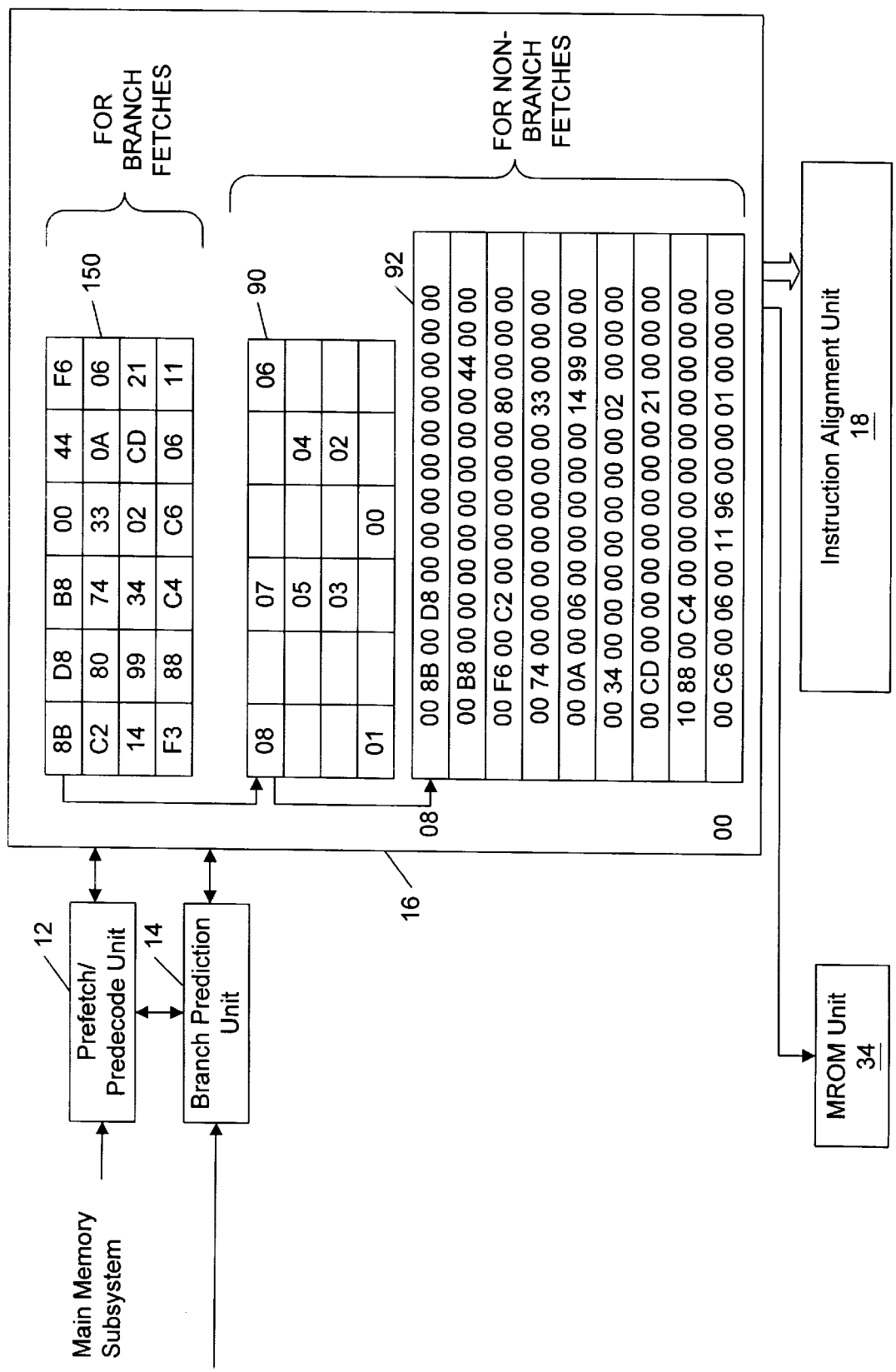
FIG. 8 is a diagram illustrating another embodiment of the instruction cache from the microprocessor depicted in FIG. 3.

Turning now to FIG. 8, another embodiment of instruction cache 16 is shown. In this embodiment, instruction cache 16 is configured to store both variable and fixed-length versions of instructions. Instruction cache 16 comprises pointer array 90, fixed-length instruction storage array 92, and a variable-length instruction storage array 150. Storage array 150 is configured to store variable-length instructions for use when receiving a requested address generated by a branch instruction that is taken. In contrast, fixed-length instruction storage array 92 stores fixed-length instructions which are accessed by requested addresses from non-branch instructions and branch instructions that are not taken. Because predecoding involves padding fields within each variable length instruction, branch targets may become skewed as a result of the padding. By storing both variable and fixed-length formats, this configuration may advantageously allow fast decoding of fixed-length instruction, while effectively compensating for the expansion of and shifting of instructions due to padding. This configuration may be particularly useful if the program contains branch or jump instructions that have a destination in the middle of an instruction. This is because such instructions may be detected and properly executed from variable-length instruction storage array 90. Instruction cache may further comprise a multiplexer (not shown) to select between the output from fixed-length instruction storage array 92 and variable-length instruction storage array 150.

In this embodiment, microprocessor 10 may be configured with two sets of decoders 20A–C, one set for decoding variable-length instructions and one set for decoding fixed-length instructions. Alternatively, a single set of decoders 20A–C may be used, wherein the decoders are allowed more clock cycles to perform variable-length decoding. In another embodiment, one or more decoders may be optimized to handle fixed-length instructions, while the remaining decoders may be optimized to handle variable-length instructions.

As the figure illustrates, each instruction may be stored in two different forms. Non-branch instructions are requested serially and therefore the shifting caused by predecoding and padding the instructions is not a problem. However, after a branch instruction, instruction cache 16 will receive a requested address that may have no correlation to the address at which the branch instruction was stored. Thus, variable-length instruction storage array 150 provides a mechanism for fetching the proper instruction after such instructions.

Figure 9:
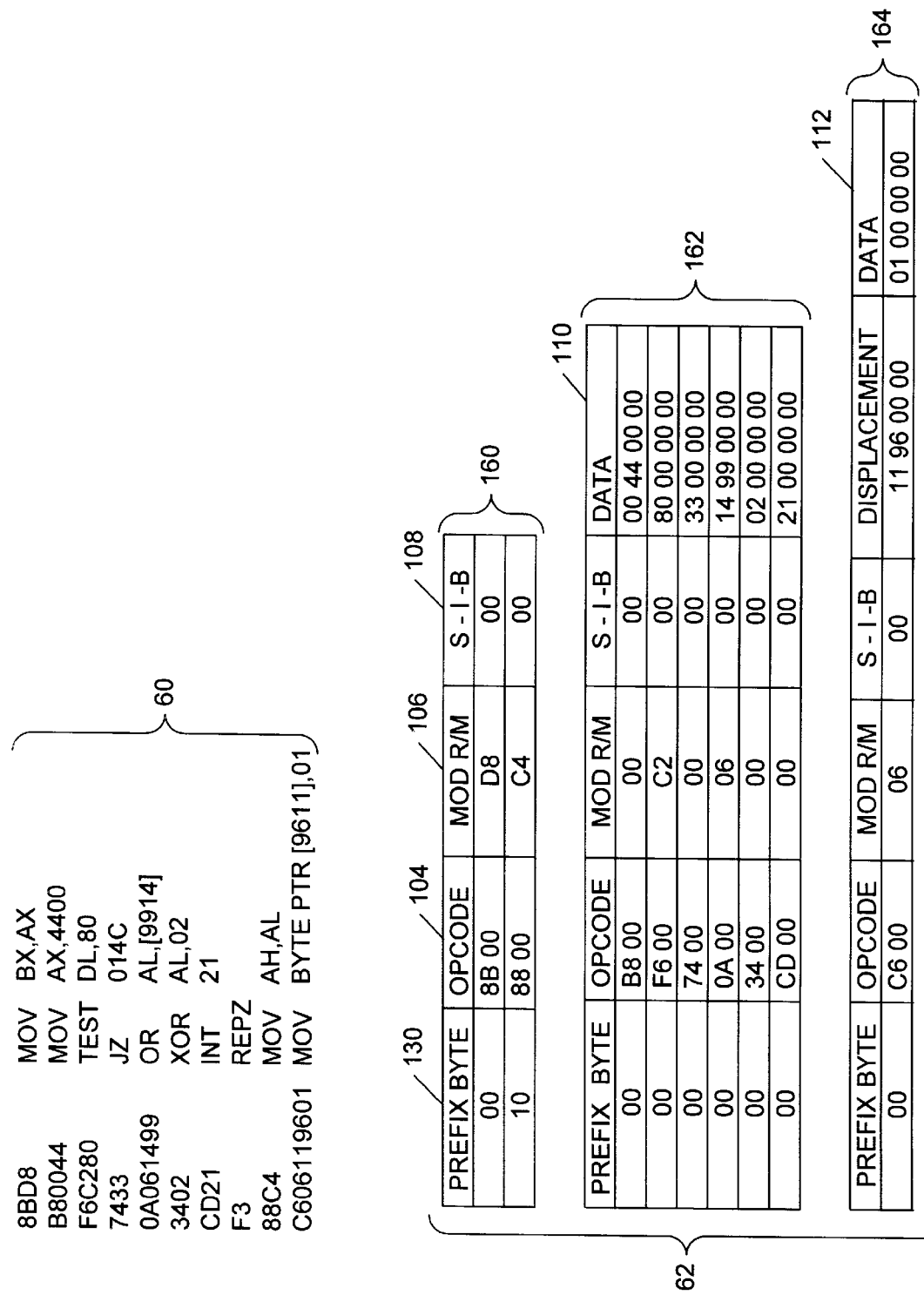
FIG. 9 is a diagram illustrating another method for decoding variable-length instructions into fixed-length instructions.

Turning now to FIG. 9, another method for predecoding variable length instructions into fixed-length instruction is shown. In this embodiment, predecode unit 12 expands variable length instructions to one of three lengths: 5 bytes, 6 bytes, or 13 bytes. Predecode unit 12 may assign an instruction to a particular group based upon whether a particular field is present within the instruction. For example, if an instruction being predecoded does not have displacement or immediate data information, then the instruction is padded to a fixed length of five bytes and is stored as part of group 160. If the instruction has data bytes but does not have displacement information, then the instruction is padded to a fixed length of nine bytes and is stored in group 142. If the instruction has both displacement bytes and data bytes, then the instruction is padded to the full thirteen bytes and is stored in group 144. As in previous embodiments, the prefix bytes may be compressed into a single byte. Advantageously, this method speeds decode while reducing the resources necessary to store fixed-length instructions within instruction cache 16.

Note that other group configurations and sizes based upon other fields are possible and contemplated. For example, an instruction that does not have any prefix, displacement, or data bytes may be padded to a length of four bytes. In another configuration, predecode unit 12 may be configured to pad and group instructions in two or four byte increments, resulting in four or eight groups of instructions. Further note that other methods may be used to pad instructions to a predetermined length. For example, in one embodiment predecoder 12 may be configured to pad constants after the final byte of the variable-length instruction. While this method may not identify each field within the instruction, it may allow for faster predecoding while still reducing decoding (particularly alignment) times.

Figure 10:
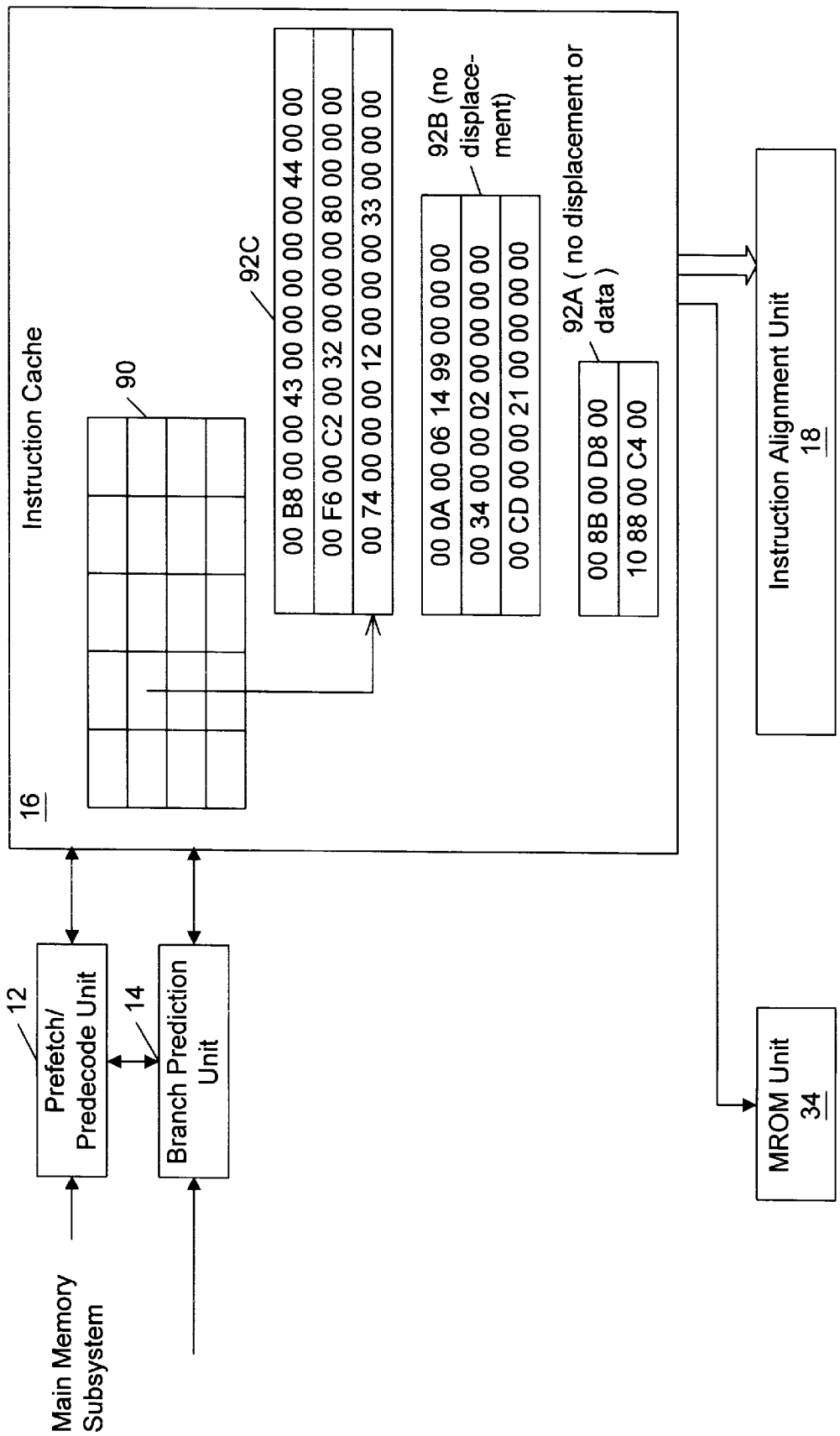
FIG. 10 is a diagram illustrating another embodiment of the instruction cache from the microprocessor depicted in FIG. 3.

Turning now to FIG. 10, an embodiment of instruction cache 16 that is configured to pad and store instructions into groups is shown. In this embodiment, pointer array 90 is configured to store pointers which point to storage locations within fixed-length instruction storage arrays 92A–C. Each fixed-length instruction storage array 92A–C (also referred to as sub-arrays) is configured to store one particular length of fixed-length instructions. Sub-array 92C may be configured to store fixed-length instructions that are 13 bytes in length (e.g., instructions having displacement data). Sub-array 92B may be configured to store fixed-length instructions that are 9 bytes in length (e.g., instruction without displacement data). Similarly, sub-array 92A may be configured to store fixed-length instructions that are only five bytes in length (e.g., instructions having no displacement bytes or data bytes). Pointer array 90 may be configured as in previous embodiments, with each storage location storing a pointer that points to one storage location within either sub-array 92A, sub-array 92B, or sub-array 92C.

Other embodiments are also contemplated. For example, in one embodiment variable-length instruction storage array 50, pointer array 90, and fixed-length instruction storage arrays 92A–C may all be incorporated into instruction cache 16. In another embodiment, there may be more than one storage array having the same length of instructions. For example, the embodiment illustrated above may comprise two fixed-length instruction storage arrays storing 9-byte long instructions. The first array may be configured to store instructions not having displacement data, whereas the second array may be configured to store instructions not having immediate data.

A software compiler configured to compile variable length instructions into fixed-length instructions is also contemplated. The variable-length to fixed length conversion may take place as part of the compiling of high-level language instructions to object code (e.g., x86 instructions), or the conversion may be performed as an optimization step during or after object code has been generated. The same methods illustrated above may be used. However, the compiler may optionally be configured to expand only certain speed-critical portions of code. Advantageously, this may improve the speed of decode for speed-critical sections of code while reducing the amount of code expansion that takes place. The compiler may be configured to indicate the start and end of fixed-length instruction sections by inserting special opcodes or special status bits. The compiler may also be configured to pad the variable-length instructions using selected constants, e.g., no operation instruction codes (NOPs).

Exemplary Computer System

Figure 11:
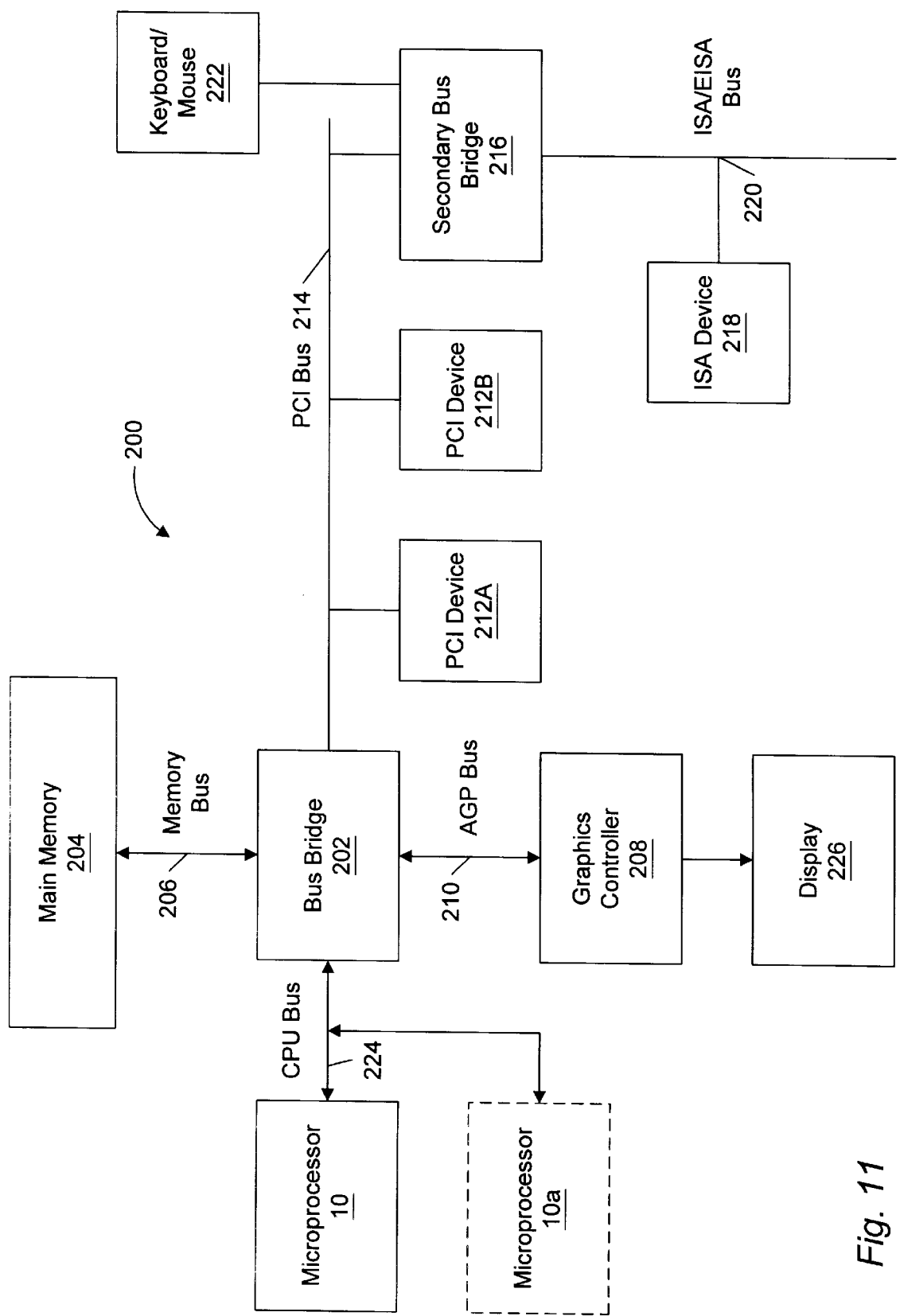
FIG. 11 is a diagram showing one embodiment of a computer system utilizing the microprocessor of FIG. 3.

Turning now to FIG. 11, a block diagram of one embodiment of a computer system 200 utilizing microprocessor 10 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Microprocessor 10 is coupled to bus bridge 202 through a CPU bus 224.

Bus bridge 202 provides an interface between microprocessor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. For example, in one embodiment, secondary bus bridge 216 includes a master PCI arbiter (not shown) for arbitrating ownership of PCI bus 214. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between microprocessor 10 and bus bridge 202 in other embodiments. Alternatively, the external cache may be coupled to bus bridge 202 and cache control logic for the external cache may be integrated into bus bridge 202.

Main memory 204 is a memory in which application programs are stored and from which microprocessor 10 primarily executes. A suitable main memory 204 comprises DRAM (Dynamic Random Access Memory), and preferably a plurality of banks of SDRAM (Synchronous DRAM).

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional microprocessors.

It is still further noted that the present discussion may refer to the assertion of various signals. As used herein, a signal is "asserted" if it conveys a value indicative of a particular condition. Conversely, a signal is "deasserted" or "not asserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Numerous variations and modifications will become apparent to those skilled in the art once the above disclosure is fully appreciated. It is intended that the following claims be interpreted to embrace all such variations and modifications.

What is claimed is:

1. A microprocessor comprising:

a predecode unit configured to read variable-length instructions from an external memory, wherein the predecode unit is configured to expand each of the variable-length instructions to a predetermined constant length by inserting instruction fields filled with one or more padding constants; and an instruction cache coupled to receive the expanded instructions from the predecode unit, wherein the instruction cache includes a lookup table storing pointers, wherein the lookup table translates fetch addresses to identify where corresponding expanded constant-length instructions are stored in the instruction cache.

2. The microprocessor of claim 1, wherein the variable-length instructions are x86 instructions.

3. The microprocessor of claim 1, wherein the predetermined constant length equals a maximum length of the variable-length instructions.

4. The microprocessor of claim 1, wherein the expanded constant-length instructions include a field of five prefix bytes, wherein one of the five prefix bytes is devoted to each of the following: segment override information, repeat information, hardware lock information, operand size information, and address size information.

5. The microprocessor of claim 1, wherein the expanded constant-length instructions include one byte for each possible prefix byte in the variable-length instructions.

6. A microprocessor comprising:

a predecode unit configured to receive variable-length instructions from an external memory or external cache, wherein the predecode unit is configured to expand each of the variable-length instructions to one of a predetermined set of lengths by inserting instruction fields filled with one or more padding constants; and an instruction cache coupled to receive the expanded instructions from the predecode unit, wherein the instruction cache includes:

a storage array for expanded instructions of the predetermined set of lengths, and a pointer array configured to store pointers, wherein the pointers translate fetch addresses corresponding to variable-length instructions to identify storage locations within the storage arrays that store the corresponding expanded instructions.

7. The microprocessor of claim 6, wherein the variable-length instructions are x86 instructions.

8. The microprocessor of claim 6, wherein the predetermined constant length equals a maximum length of the variable-length instructions.

9. The microprocessor of claim 6, wherein the expanded constant-length instructions include a field of five prefix bytes, wherein one of the five prefix bytes is devoted to each of the following: segment override information, repeat information, hardware lock information, operand size information, and address size information.

10. The microprocessor of claim 6, wherein the expanded constant-length instructions include one byte for each possible prefix byte in the variable-length instructions.

11. A microprocessor comprising:

a predecode unit configured to read variable-length instructions from an external memory, wherein said predecode unit is configured to expand each of said variable-length instructions to a predetermined constant length by inserting instruction fields filled with one or more padding constants; and an instruction cache coupled to receive the expanded constant length instructions from the predecode unit, wherein the instruction cache includes:

a first storage array for the variable-length instructions, a second storage array for the expanded constant length instructions, and a pointer array configured to store pointers, wherein the pointers translate fetch addresses to identify where corresponding expanded instructions are stored.

12. The microprocessor of claim 11, wherein the variable-length instructions are x86 instructions.

13. The microprocessor of claim 11, wherein the predetermined constant length equals a maximum length of the variable-length instructions.

14. The microprocessor of claim 11, wherein the expanded constant-length instructions include a field of five prefix bytes, wherein one of the five prefix bytes is devoted to each of the following: segment override information, repeat information, hardware lock information, operand size information, and address size information.

15. The microprocessor of claim 11, wherein the expanded constant-length instructions include one byte for each possible prefix byte in the variable-length instructions.

16. A method for predecoding variable-length instructions comprising:

receiving variable-length instructions;

predecoding the variable-length instruction by:

selecting a length for each variable-length instruction from a set of predetermined lengths, wherein one of said set of predetermined lengths equals a maximum length for the variable length instructions;

expanding the variable length instruction by inserting one or more instruction fields filled with one or more padding constants;

storing the expanded instructions in an instruction cache;

updating a translation table to reflect the location of the stored expanded instructions;

reading the stored expanded instructions; and executing the expanded instructions in lieu of the variable length instructions.

17. The method of claim 16, further comprising:

storing the variable-length instructions in the instruction cache;

accessing the stored variable-length instructions in response to a taken branch instruction; and accessing the stored expanded instructions in response to a not-taken branch instruction.

18. The method of claim 16, wherein the variable-length instructions are x86 instructions.

19. The method of claim 16, wherein the variable length instructions are expanded to a predetermined constant length that equals a maximum length of the variable-length instructions.

20. The method of claim 16, wherein the expanded instructions each include a field of five prefix bytes, wherein one of the five prefix bytes is devoted to each of the following: segment override information, repeat information, hardware lock information, operand size information, and address size information.

* * * * *